UNITED STATES PATENT OFFICE 2,648,707

N-β-NITRAMINOETHYL-N'-ARYL-N"-NITROGUANIDINES

Arthur F. McKay, Ottawa, Ontario, Canada, assignor to Her Majesty the Queen in the right of Canada as represented by the Minister of National Defence, Ottawa, Ontario, Canada No Drawing. Application May 19, 1952,
Serial No. 288,769

7 Claims. (Cl. 260—551)

This invention relates to a new series of guanidine derivatives and to their preparation.

According to the present invention, the new series is N-β-nitraminoethyl-N'-aryl-N"-nitroguanidine compounds of the general formula:

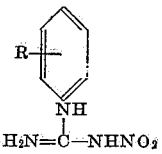

$$O_2NNHCH_2CH_2N=C-NHNO_2$$

wherein R represents a substituent which is a lower alkyl, lower alkoxy, hydroxy or acetamido group or is hydrogen or a halogen. The qualification "lower" in relation to alkyl and alkoxy groups is used herein to signify that such groups contain not more than six carbon atoms in the alkyl chain. The compounds of the new series possess explosive properties which may be improved by further nitration.

These new compounds may be prepared by reacting 1-nitro-2-nitramino-2-imidazoline (J. A. C. S., 70, (1948)) with the appropriate arylamine. A wide range of reaction conditions may be employed.

This reaction is shown by the equation:

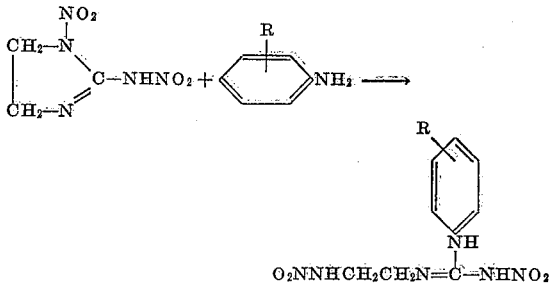

$$O_2NNHCH_2CH_2N=C-NHNO_2$$

According to one particular method, the reaction may be effected with generally excellent yields by refluxing the two reagents in an aqueous, preferably aqueous alcoholic, solution. The aqueous alcohol is preferably concentrated, e. g. substantially 95%. Aqueous ethanol is generally preferred but aqueous methanol, propanol or butanol may also be used.

In this refluxing method, it is generally desirable to use an excess of arylamine to facilitate purification of the product and to avoid waste of the more expensive reagent, 1-nitro-2-nitramino-2-imidazoline.

According to another particular method, the reaction may be effected by covering 1-nitro-2-nitramino-2-imidazoline with a liquid arylamine and allowing it to stand until reaction has taken place. This reaction may take several days at room temperature.

The invention is illustrated by the following examples in which the parts are by weight:

EXAMPLE 1

*N-β-nitraminoethyl-N'-phenyl-N"-nitroguanidine*

8.5 parts of 1-nitro-2-nitramino-2-imidazoline and 9.4 parts of aniline were refluxed in 65 parts of 95% ethanol for seventy-five minutes. The solution was cooled and acidified with dilute hydrochloric acid (10%). The crystalline product was filtered off and washed freely with water to remove aniline hydrochloride. A yield of 12.5 parts of the crude product was obtained. The crude product (M. P. 137.5–138.5° C. with gassing) melted at 139.5–140.5° C. with gassing after one crystallization from absolute alcohol (23.2 cc./g.). Analyses of the crude product gave 40.49% carbon, 4.67% hydrogen and 31.60% nitrogen compared to calculated values of 40.20% carbon, 4.48% hydrogen and 31.40% nitrogen.

EXAMPLE 2

*N-β-nitraminoethyl-N'-p-anisyl-N"-nitroguanidine*

5 parts of 1-nitro-2-nitramino-2-imidazoline and 7.1 parts of p-anisidine were refluxed in 60 parts of 95% ethanol for ninety minutes. The solution was cooled to room temperature and acidified with concentrated hydrochloric acid. After the solution was diluted with several volumes of water, the crystals (M. P. 173–176° C. with decomposition) were removed by filtration in a yield of 8.5 parts (100%). One crystallization from 70% ethanol raised the melting point to 176.5–177° C. with decomposition. Analyses gave 40.57% carbon, 4.80% hydrogen and 28.20% nitrogen, compared with the calculated values for $C_{10}H_{14}N_6O_5$ of 40.20% carbon, 4.69% hydrogen and 28.20% nitrogen.

EXAMPLE 3

*N-β-nitraminoethyl-N'-p-phenetyl-N"-nitroguanidine*

5 parts of 1-nitro-2-nitramino-2-imidazoline and 7.94 parts of p-phenetidine were refluxed in 40 parts of 95% ethanol for sixty-five minutes. After the solution had cooled to room temperature, it was acidified with concentrated hydrochloric acid and diluted with 40 parts of water. On standing, a solid (M. P. 133–135.5° C. with decomposition) separated which was recovered by filtration in a yield of 9.0 parts (101.7%). This mixture of product and p-phenetidine hydrochloride was crystallized from 125 parts of 95% ethanol to yield 7.5 parts (85%) of a product having a melting point of 134–135.5° C.

with decomposition. Analyses gave 42.39% carbon, 5.28% hydrogen and 27.30% nitrogen compared with the calculated of 42.30% carbon, 5.13% hydrogen and 26.90% nitrogen.

EXAMPLE 4

*N-β-nitraminoethyl-N'-p-chlorophenyl-N''-nitroguanidine*

5 parts of 1-nitro-2-nitramino-2-imidazoline and 7.4 parts of p-chloroaniline were refluxed in 40 parts of 95% ethanol for seventy-five minutes. After the solution cooled to room temperature, it was acidified with dilute hydrochloric acid (10%). A purple oil separated which soon solidified into purplish white crystals (M. P. 137–140° C. with decomposition) in a yield of 9 parts (104%). This mixture of product and p-chloroaniline hydrochloride was purified by refluxing with 350 parts of absolute alcohol, filtering off insoluble hydrochloride, and then allowing the filtrate to cool to room temperature. The crystals obtained were in a yield of 6–9 parts (80%) and melted at 155–156° C. with decomposition. Analyses gave 35.75% carbon, 3.80% hydrogen and 11.84% chlorine as compared with the calculated values of 35.70% carbon, 3.64% hydrogen and 11.71% chlorine.

EXAMPLE 5

*N-β-nitraminoethyl-N'-p-bromophenyl-N''-nitroguanidine*

5 parts of 1-nitro-2-nitramino-2-imidazoline and 10 parts of p-bromo-aniline were refluxed in 40 parts of 95% ethanol for ninety minutes. The solution was allowed to come to room temperature after which it was acidified with concentrated hydrochloric acid and diluted with three times its volume of water. The crystals (M. P. 149–154° C. with decomposition) were filtered off and washed well with water and ethanol their yield being 8.9 parts (89.7%). Two crystallizations from 95% ethanol (14.7 cc./g.) raised the melting point to 153–153.5° C. with decomposition. Analyses gave 31.26% carbon, 3.31% hydrogen and 23.36% bromine compared with the calculated values for $C_9H_{11}N_6O_4$ of 31.10% carbon, 3.17% hydrogen and 23.06% bromine.

EXAMPLE 6

*N-β-nitraminoethyl-N'-p-tolyl-N''-nitroguanidine*

5 parts of 1-nitro-2-nitramino-2-imidazoline and 4.28 parts of p-toluidine were refluxed in 30 parts of 95% ethanol for four hours. At the end of the reflux period one volume of water was added and the solution cooled to room temperature. The crystals were removed by filtration and washed with a small amount of 95% ethanol, their yield being 7.22 parts (89.6%). The melting point of 163.5–164° C. with decomposition remained unchanged after crystallizing from 95% ethanol (29 cc./g). Analysis gave 42.74% carbon, 5.19% hydrogen and 30.02% nitrogen compared with the calculated values for $C_{10}H_{14}N_6O_4$ of 42.55% carbon, 4.96% hydrogen and 29.78% nitrogen.

EXAMPLE 7

*N-β-nitraminoethyl-N'-m-chlorophenyl-N''-nitroguanidine*

5 parts of 1-nitro-2-nitramino-2-imidazoline and 5.1 parts of m-chloraniline were refluxed in 30 parts of 95% ethanol for two hours. After the solution cooled to room temperature, it was diluted with seven times its volume of water and acidified with concentrated hydrochloric acid. The aqueous phase was decanted from the oil to which 30 parts of ether were added. On standing overnight the oil crystallized. The crystals (M. P. 123–126° C. with slight gassing) were filtered off and washed with ether, their yield being 6.71 parts (77.9%). One crystallization from 95% ethanol raised the melting point to 124–125° C. with gassing. Analysis gave 35.80% carbon, 3.80% hydrogen and 28.00% nitrogen compared with the calculated values for $C_9H_{11}ClN_6O_4$ of 35.70% carbon, 3.63% hydrogen and 27.78% nitrogen.

EXAMPLE 8

*N-β-nitraminoethyl-N'-m-phenetyl-N''-nitroguanidine*

5 parts of 1-nitro-2-nitramino-2-imidazoline and 8.2 parts of m-phenetidine were refluxed in 30 parts of 95% ethanol for two hours. The solution was diluted with seven times its volume of water and the aqueous fraction was decanted from the oil. This oil was covered with 30 parts of ether and left overnight. The crystals (M. P. 135–136.5° C. with decomposition) were filtered off and washed with ether their yield being 8.07 parts (90.7%). Analysis gave 42.26% carbon, 5.34% hydrogen and 26.91% nitrogen compared with that calculated for $C_{11}H_{16}N_6O_5$ of 42.28% carbon, 5.12% hydrogen and 27.18% nitrogen.

EXAMPLE 9

*N-β-nitraminoethyl-N'-o-tolyl-N''-nitroguanidine*

5 parts of 1-nitro-2-nitramino-2-imidazoline and 6.42 parts of o-toluidine were refluxed in 30 parts of 95% ethanol for two hours. The solution was allowed to cool to room temperature and eight times its volume of water were added. The aqueous phase was decanted from the oil which then was covered with ether. On standing overnight crystals separated. These crystals (M. P. 107–108° C.) were filtered off and washed with ether their yield being 5.22 parts (50.4%). One crystallization from 95% ethanol raised the melting point to 108–109° C. Analysis gave 42.90% carbon, 5.07% hydrogen and 29.92% nitrogen compared with the calculated values for $C_{10}H_{14}N_6O_4$ of 52.52% carbon, 4.96% hydrogen and 29.78% nitrogen.

EXAMPLE 10

*N-β-nitraminoethyl-N'-p-hydroxyphenyl-N''-nitroguanidine*

5 parts of 1-nitro-2-nitramino-2-imidazoline and 6.3 parts of p-aminophenol in 40 parts of 95% ethanol were refluxed for two hours. After the solution had cooled to room temperature, it was acidified with 10% hydrochloric acid solution and placed in the refrigerator. The crystals were recovered by filtration and washed with water, their yield being 9.08 parts. This mixture of product and p-aminophenol hydrochloride was purified by two crystallizations from 95% ethanol. The yield of final product was 7.18 parts (88.4%). It melted at 172–173° C. with decomposition. Analysis gave 38.12% carbon, 4.13% hydrogen and 29.87% nitrogen compared with the calculated values for $C_9H_{12}N_6O_5$ of 38.01% nitrogen, 4.22% hydrogen and 29.58% nitrogen.

EXAMPLE 11

*N-β-nitraminoethyl-N'-p-sec.amylphenyl-N"-nitroguanidine*

5 parts of 1-nitro-2-nitramino-2-imidazoline and 8.15 parts of p-sec.amylaniline were refluxed in 30 parts of 95% ethanol for two hours. The cooled solution was diluted with 100 parts of water and the aqueous fraction removed by decantation. The insoluble oil was washed twice more with fifty parts of water, the water being decanted off after each washing. The residual oil was dissolved in 30 parts of diethyl ether and petroleum ether was added to the point of turbidity. On standing in the refrigerator over night 8.02 parts (83.0%) of the product separated. The melting point of 128-132° C. was raised to 137-138° C. by three crystallizations from ethyl acetate.

EXAMPLE 12

*N-β-nitraminoethyl-N'-p-phenetyl-N"-nitroguanidine*

2 parts of 1-nitro-2-nitramino-2-imidazoline covered with 6 parts of p-phenetidine were allowed to stand at room temperature for eight days. The crystals were filtered off and washed with ethanol. The crude product melted at 125–133° C., yield 2.15 parts (60.3%). One crystallization from 95% ethanol raised the melting point to 134.5–135.5° C. A mixed melting point determination with a sample of the N-β-nitraminoethyl-N'-p-phenetyl-N"-nitroguanidine (M. P. 134–135.5° C.), prepared as in Example 3, was not depressed.

EXAMPLE 13

*N-β-nitraminoethyl-N'-p-acetamidophenyl-N"-nitroguanidine*

4 parts of 1-nitro-2-nitramino-2-imidazoline and 4.46 parts of p-aminoacetanilide in 30 parts of 95% ethanol were refluxed for two hours. After the solution had cooled to room temperature approximately 20 parts of water were added. On standing, rosettes of buff colored crystals separated, yield 7.39 parts (99.5%). The crude product decomposed at 185–189° C. depending on the rate of heating. The melting point was unchanged after crystallizing from 95% ethanol.

EXAMPLE 14

*N-β-nitraminoethyl-N'-p-anisyl-N"-nitroguanidine*

3 parts of 1-nitro-2-nitramino-2-imidazoline and 2.7 parts of p-anisidine were refluxed in 25 parts of 25% ethanol for fifteen minutes. The reaction mixture was allowed to cool to room temperature after which it was diluted with 25 parts by weight of water. The solid was removed by filtration and washed with water and ether, yield 4.86 parts (95.18%). The crude product melted at 170–171° C. with decomposition. A mixed melting point determination with an authentic sample of N-β-nitraminoethyl-N'-p-anisyl-N"-nitroguanidine from Example 2 was not depressed.

EXAMPLE 15

*N-β-nitraminoethyl-N'-p-anisyl-N"-nitroguanidine*

3 parts of 1-nitro-2-nitramino-2-imidazoline and 2.7 parts of p-anisidine were refluxed in 25 parts of 50% ethanol for forty minutes. The remainder of the procedure was the same as outlined in Example 14, yield 4.75 parts (93%). The crude product melted at 170–171° C. with decomposition.

EXAMPLE 16

*N-β-nitraminoethyl-N'-p-anisyl-N"-nitroguanidine*

3 parts of 1-nitro-2-nitramino-2-imidazoline and 2.7 parts of p-anisidine were refluxed in 25 parts of 50% n-propanol for fifteen minutes. The remainder of the procedure, same as outlined in Example 14, yield 4.72 parts (92.4%). The melting point of the crude product was raised from 167–170° C. to 170–171° C. with decomposition by one crystallization from 95% ethanol.

I claim:

1. As a new composition of matter, a compound of the general formula:

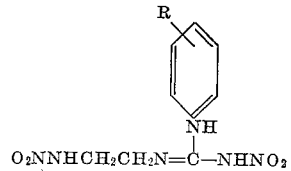

$$O_2NNHCH_2CH_2N=C-NHNO_2$$

wherein R is a substituent selected from the group consisting of hydrogen, halogens and lower alkyl, lower alkoxy, hydroxy and acetamido groups.

2. A process for preparing a guanidine compound in which 1-nitro-2-nitramino-2-imidazoline is reacted with a substituted aniline of which the phenyl ring contains a substituent selected from the group consisting of hydrogen, halogens, and lower alkyl, lower alkoxy, hydroxy and acetamido groups.

3. A process for preparing a guanidine compound in which 1-nitro-2-nitramino-2-imidazoline is refluxed in an aqueous solution with a substituted aniline of which the phenyl ring contains a substituent selected from the group consisting of hydrogen, halogens, and lower alkyl, lower alkoxy, hydroxy and acetamido groups.

4. A process for preparing a guanidine compound in which 1-nitro-2-nitramino-2-imidazoline is refluxed in an aqueous alcoholic solution with a substituted aniline of which the phenyl ring contains a substituent selected from the group consisting of hydrogen, halogens, and lower alkyl, lower alkoxy, hydroxy and acetamido groups.

5. A process as claimed in claim 4 in which the aqueous alcoholic solvent is concentrated.

6. A process as claimed in claim 4 in which the aqueous alcoholic solvent is concentrated aqueous ethanol.

7. A process for preparing a guanidine compound in which 1-nitro-2-nitramino-2-imidazoline is covered with a substituted aniline of which the phenyl ring contains a substituent selected from the group consisting of hydrogen, halogens, and lower alkyl, lower alkoxy, hydroxy and acetamido groups, and allowed to stand until reaction has taken place.

ARTHUR F. McKAY.

References Cited in the file of this patent

UNITED STATES PATENTS

| Number | Name | Date |
|---|---|---|
| 2,559,085 | McKay | July 3, 1951 |

OTHER REFERENCES

McKay et al.: J. Am. Chem. Soc., vol. 70, pp. 3990 to 3994 (1948).

McKay et al.: J. Am. Chem. Soc., vol. 71, pp. 766 to 770 (1949).